United States Patent [19]

Himuro

[11] Patent Number: 5,188,684
[45] Date of Patent: Feb. 23, 1993

[54] PNEUMATIC RADIAL TIRES
[75] Inventor: Yasuo Himuro, Tokyo, Japan
[73] Assignee: Bridgestone Corporation, Tokyo, Japan
[21] Appl. No.: 683,159
[22] Filed: Apr. 10, 1991
[30] Foreign Application Priority Data
  Apr. 13, 1990 [JP] Japan .................................. 2-96318
[51] Int. Cl.⁵ ............................................. B60C 11/11
[52] U.S. Cl. ............................................. 152/209 R
[58] Field of Search ...................... 152/209 R, 209 B; D12/146-149

[56] References Cited
U.S. PATENT DOCUMENTS

D. 314,538  2/1991  Martin .............................. D12/147
4,796,683  1/1989  Kawabata et al. .
4,986,324  1/1991  Suzuki et al. .................... 152/209 R

FOREIGN PATENT DOCUMENTS 0064934  11/1982  European Pat. Off. ........ 152/209 D
0151966   8/1985  European Pat. Off. ........ 152/209 D
3013958  10/1980  Fed. Rep. of Germany .
0169305   9/1985  Japan ............................. 152/209 D
2127105   5/1990  Japan ............................. 152/209 R OTHER PUBLICATIONS
U.S. patent application Ser. No. 07/675,002 filed Mar. 26, 1991.

Primary Examiner—Michael W. Ball
Assistant Examiner—Nancy T. Krawczyk
Attorney, Agent, or Firm—Sughrue, Mion, Zinn Macpeak & Seas

[57] ABSTRACT

A pneumatic radial tire comprises at least one circumferential groove arranged at an end portion in widthwise direction of a tread, and plural slant grooves arranged at an approximately equal interval in the circumferential direction of the tire. In this tire, a circumferential width of a portion of the slant groove located from the circumferential groove toward a tread end and opening to the circumferential groove is within a range of 1.5-3.0 times of a circumferential width of the slant groove at a position of ground contacting end.

5 Claims, 3 Drawing Sheets

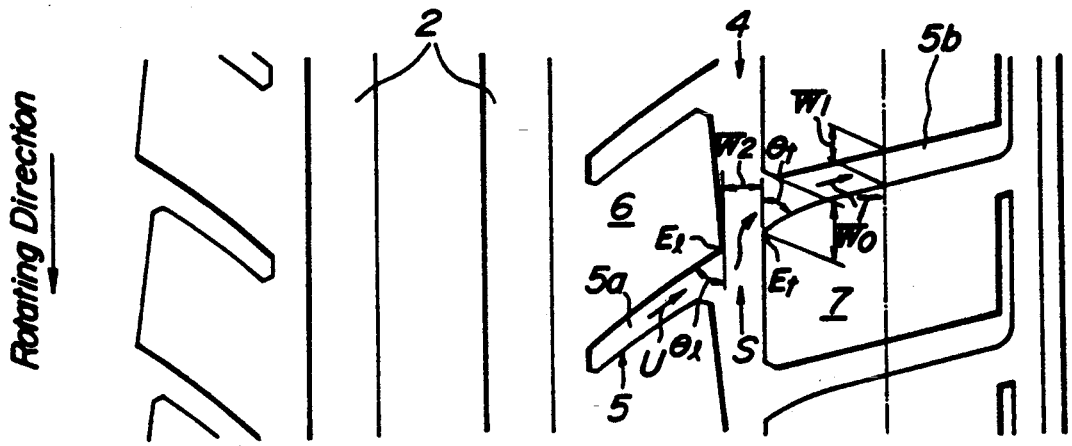
FIG_2
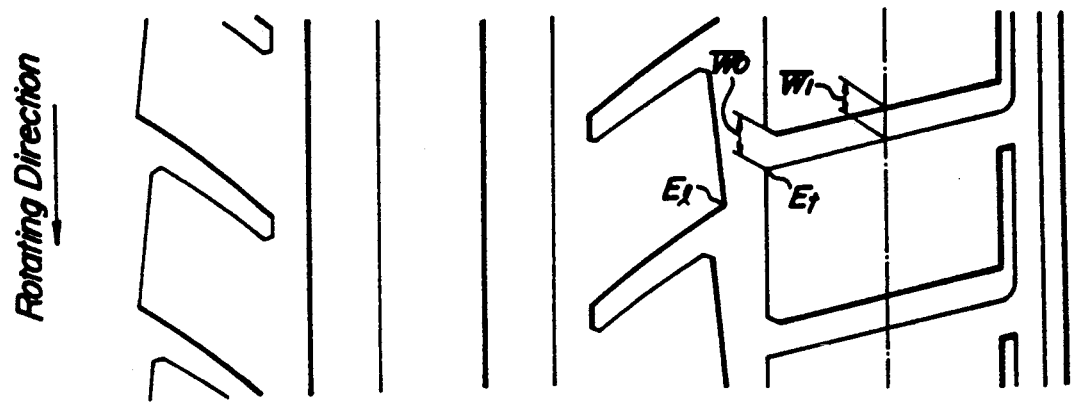
FIG_3
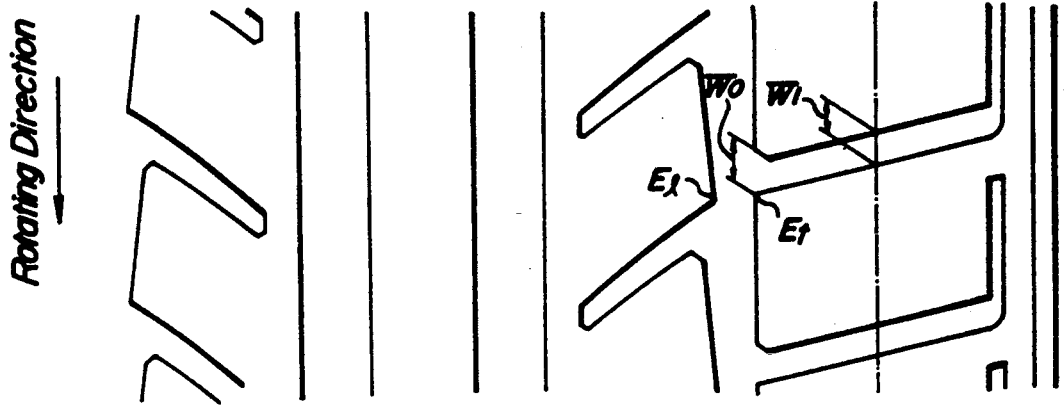
FIG_4

PNEUMATIC RADIAL TIRES

BACKGROUND OF THE INVENTION

1. Field of the Invention

This invention relates to a pneumatic radial tire requiring high running performance, and more particularly to a pneumatic radial tire capable of effectively realizing improvement of drainage property on wet road surface and reduction of pattern noise with excellent steering stability on dry road surface.

2. Related Art Statement

Among the conventional high running performance tires, tires mainly aiming at the improvement of drainage property are generally formed by arranging widthwise grooves each of which grooves continuously extends across a circumferential groove, in a region ranging from a central portion of a tread to a tread end. Particularly, these tires have a so-called unidirectional pattern that each of the widthwise grooves is inclined to approach its lower end portion viewed at a posture mounted onto a vehicle to the central portion of the tread toward the rotational direction of the tire. Moreover, the width of the widthwise groove is substantially uniform over a full length thereof, or is gradually enlarged toward the tread end.

In the high running performance tire aiming at the reduction of pattern noise, it is general to conduct a so-called phase shifting that portions of the widthwise groove separated through the circumferential groove are relatively displaced to each other in the circumferential direction of the tire.

When the widthwise groove is continuously extended across the circumferentail groove for improving the drainage property, it is preferable to make an inclination angle of the widthwise groove with respect to the meridional line of the tire large under such a condition that the width of the widthwise groove is, for example, equal over full length thereof for further improvement of the drainage property. Particularly, the inclination angle is in general to actually be within a range of 10°–20° in a shoulder portion of the tread from a viewpoint of a necessity for ensuring tire performances on dry road. As a result, in order to effectively improve the drainage property, there is no means other than widening of the width of the widthwise groove. That is, the continuity of the widthwise groove in the widthwise direction of the tread and the widening of the width of the widthwise groove undesirably bring about an increase of pattern noise.

In order to reduce the pattern noise, the portions of the widthwise groove separated through the circumferential groove are relatively shifted to each other in the circumferential direction of the tire. In this case, however, it is obliged to degrade the drainage property on wet road surface.

SUMMARY OF THE INVENTION

It is, therefore, an object of the invention to advantageously solve the aforementioned problems of the conventional techniques and to provide a pneumatic radial tire capable of simultaneously establishing conflicting performances of improvement of drainage property on wet road surface and reduction of pattern noise while holding good steering stability on dry road surface. Fundamentally, the invention is to provide a pneumatic radial tire in which a shape of a portion in a groove extending in the widthwise direction of the tire and opening to a circumferential groove can be improved at a side of the circumferential groove facing to the tread end without widening the width of the groove or increasing the pattern noise to smoothly flow drained water into the above groove portion.

According to the invention, there is the provision of a pneumatic radial tire comprising at least one circumferential groove extending circumferentially of the tire at at least one end portion in widthwise direction of a tread and plural slant grooves arranged at an approximately equal interval in the circumferential direction of the tire and each extending diagonally across the circumferential groove and being inclined in a direction of approaching a lower end at a posture mounted onto a vehicle to a central portion of the tread toward a rotational direction of the tire, characterized in that a circumferential width of a portion of each of said slant grooves located from the circumferential groove toward a tread end and opening to the circumferential groove is within a range of 1.5–3.0 times of a circumferential width of the slant groove at a position of ground contacting end.

BRIEF DESCRIPTION OF THE DRAWINGS

The invention will be described with reference to the accompanying drawings, wherein:

FIG. 2 is an enlarged schematic view of the tread pattern shown in FIG. 1b according to the invention; and FIGS. 3 and 4 are schematic views of tread patterns as a comparative example.

DESCRIPTION OF THE PREFERRED EMBODIMENTS

Figure 1A:
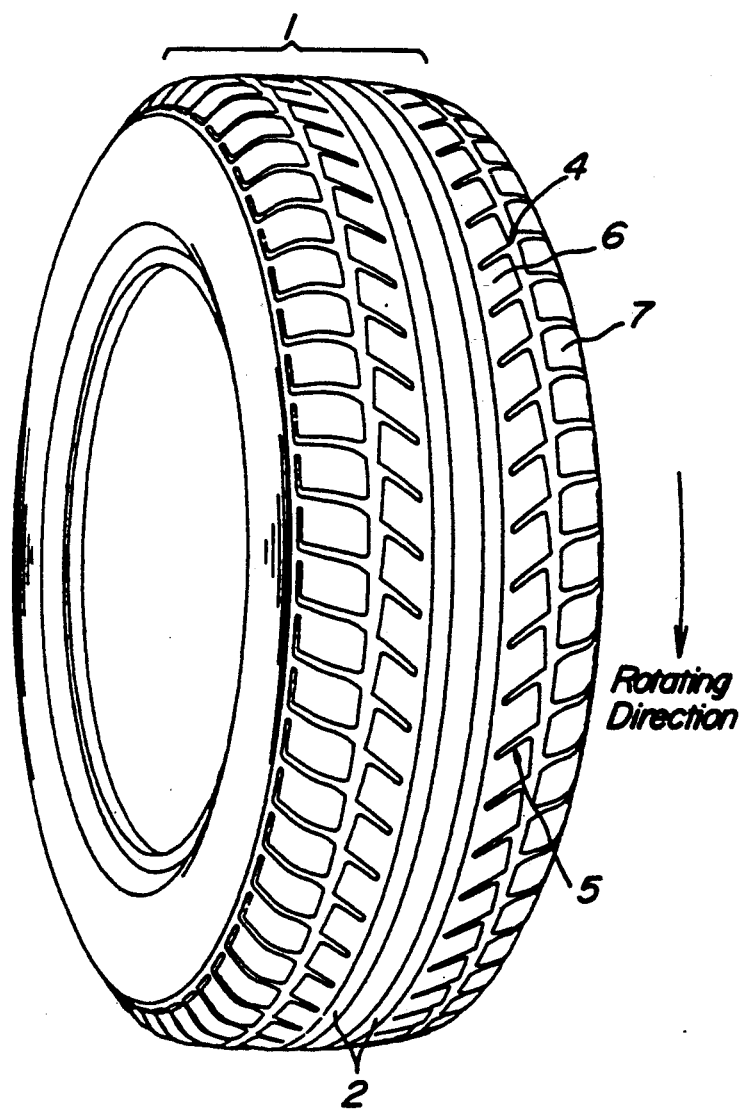
FIG. 1a is a perspective view of a tire according to the invention.

In the pneumatic radial tire according to the invention, the circumferential width of the slant groove opening to the circumferential groove in the circumferential direction of the tire is within a range of 1.5–3.0 times of the circumferential width at the position of the ground contacting end, so that when the tire is run on a wet road surface having a water depth of about 5 mm, the stream of drained water passing through the circumferential groove can flow into the slant groove to largely improve the drainage property on wet road surface.

During running of the tire on a wet road, water is drained through the circumferential groove and the slant groove toward a direction opposite to the rotating direction of the tire and a side of the tread end in the widthwise direction of the tire having a small ground contacting pressure. In this case, the circumferential groove having a large groove volume drains a greater amount of water, but the circumferential width of the portion of the slant groove opening to the circumferential groove is made wider than that at the ground contacting end, whereby the flow of water from the circumferential groove into the slant groove can smoothly be carried out under a small difference of water pressure between the circumferential groove and the slant groove to provide an excellent drainage property on wet road surface.

When the above circumferential width ratio is less than 1.5 times, the difference in internal pressure between the circumferential groove and the slant groove becomes large and hence the smooth flowing of water into the slant groove can not be expected. When it exceeds 3.0 times, the circumferential width of the slant groove portion opening to the circumferential groove is too wide and hence the pattern noise increases in addition to the improvement of drainage property.

In the tire according to the invention, the circumferential groove crossing with the slant groove may take various shapes such as straight, zigzag and other proper shapes, if necessary.

In order to obtain a required circumferential width ratio of the slant groove at given positions in the widthwise direction, it is preferable that the portion of the slant groove opening to the circumferential groove is enlarged by largely chamfering a kicking-out portion of an island unit adjacent to the portion of the slant groove. Thus, the flow of drained water from one island unit to next island unit in the circumferential groove can considerably and smoothly be branched into the slant groove as compared with the case that the opening portion of the slant groove is enlarged at a stepping-in side of the next island unit.

In the tire according to the invention, the increase of pattern noise can effectively be prevented and the drainage property on wet road surface is largely improved without increasing the inclination angle of the slant groove with respect to the meridional line of the tire and enlarging the width of the slant groove over its full length, or sufficiently holding the steering stability on dry road surface.

In order to establish the reduction of pattern noise and the improvement of the drainage property on wet road surface at a higher level, it is preferable that among island units defined by the slant grooves at both sides of the circumferential groove, a level in a kicking-out side corner of an island unit located at a side of the tread end through the circumferential groove is made approximately equal to a level in a stepping-in side corner of another island unit located as a side of the central portion of the tread through the circumferential groove in the circumferential direction of the tire. Thus, a portion of the slant groove located at the tread end side through the circumferential groove is shifted from a portion of this slant groove located at the central portion side of the tread through the circumferential groove by an amount corresponding to approximately a width of the slant groove in the circumferential direction of the tire. This is due to the fact that when water drained from the portion of the slant groove at the central portion side of the tread to the circumferential groove flows into the portion of the slant groove located at the tread end side, it is somewhat swept away toward downstream side by water flowing through the circumferential groove. Also, there is caused a difference in the timing of road surface strike between the island unit defined in the central portion side of the tread and the island unit defined in the tread end side.

Figure 1B:
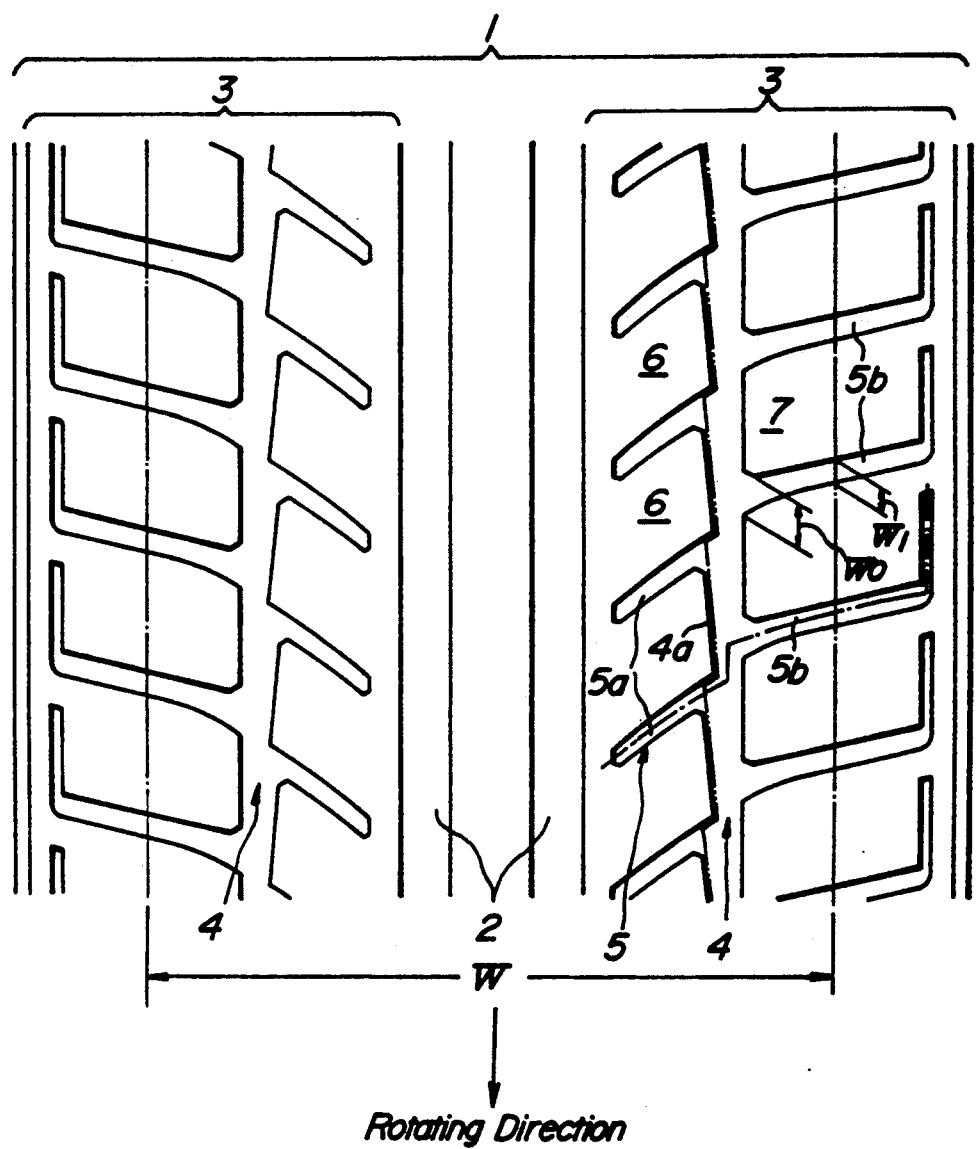
FIG. 1b is a schematic view of a first embodiment of the tread pattern according to the invention.

In FIG. 1a is perspectively shown a first embodiment of the tire according to the invention, and also a tread pattern thereof is shown in FIG. 1b.

Moreover, the reinforcing structure of this tire is the same as in the conventionally known radial tire, so that the illustration thereof is omitted for convenience' sake.

The tire of the illustrated embodiment has a size of PSR 205/60 R15, a ground contacting width W of 164 mm and a negative ratio of 35%. In such a tire, two straight main grooves 2 extending circumferentially of the tire and having a width of 12.5 mm are arranged in a central portion of a tread 1, while a circumferential groove 4 extending circumferentially of the tire is arranged in each of the side end portions 3 located from the main grooves 2 toward side ends of the tread. In the circumferential groove 4, a groove wall facing to the side of the tread end is extended straight in the circumferential direction of the tire and the other groove wall facing to the side of the central portion of the tread is extended substantially sawtoothedly in the circumferential direction of the tire. The circumferential groove 4 has a maximum groove width of 9 mm and a minimum groove width of 7 mm.

In the illustrated tire, plural slant grooves 5 extending diagonally across the circumferential groove 4 are arranged at an approximately equal interval in the circumferential direction of the tire, in which each of the slant grooves 5 is inclined in a direction of approaching its lower end viewed at a posture mounted onto a vehicle toward the central portion of the tread and a portion 5a of the slant groove 5 located at the central portion side of the tread is opened at a bent portion of a sawtoothed groove wall 4a of the circumferential groove 4.

Moreover, a linear segment of the sawtoothed groove wall 4a is inclined in a direction of approaching its upper end viewed at the mounted posture onto the vehicle toward the central portion of the tread. Thus, the wearing states at stepping-in side corner and kicking-out side corner in an island unit 6 defined by the circumferential groove 4 and two slant groove portions 5a are approximately equalized.

According to the invention, a circumferential width $W_0$ of a portion 5b of the slant groove 5 located through the circumferential groove 4 toward the tread end side and opening to the circumferential groove 4 is within a range of 1.5–3.0 times of a circumferential width $W_1$ of the portion 5b at a ground contacting end.

When the tire having the above tread pattern is run on a wet road having a water depth of, for example, about 5 mm, water flowing in the circumferential groove 4 as shown by an arrow S in FIG. 2 can flow smoothly into the portion 5b of the slant groove 5 as previously mentioned, whereby a very excellent drainage property is attained.

When the circumferential width ratio $W_0/W_1$ is less than 1.5 times, the smooth flowing of draining water into the slant groove portion 5b can not be expected as mentioned above. When it exceeds 3.0 times, there is no problem in the branched flowing, but $W_0$ per unit pitch becomes too large to bring about the increase of pattern noise.

In order to realize the above circumferential width ratio of the slant groove portion 5b, it is favorable that the circumferential width of the slant groove portion is enlarged at a position opening to the circumferential groove 4 by largely chamfering a kicking-out portion of an island unit 7 adjacent to the slant groove portion 5b as previously mentioned. In this case, the branched flowing of draining water into the slant groove portion 5b can be more smoothened as compared with the case that the circumferential width of the slant groove portion 5b is enlarged at the position opening to the circumferential groove by chamfering a stepping-in portion of the island unit.

According to this tire, therefore, the drainage property on wet road surface can largely be improved without increasing the inclination angle of the slant groove with respect to the meridional line of the tire and enlarging the circumferential width of the slant groove over its full length. Consequently, the degradation of the steering stability on dry road surface and the increase of the pattern noise can be eliminated substantially completely.

In the tire of this embodiment, as shown in FIG. 2, among island units 6, 7 defined by the slant grooves 5 at both sides of the circumferential groove 4, a level in a kicking-out side corner $E_t$ of the island unit 7 located at the tread end side through the circumferential groove 4 is made approximately equal to a level in a stepping-in side corner $E_1$ of another island unit 6 located as the central portion side of the tread through the circumferential groove 4 in the circumferential direction of the tire. Thus, the slant groove portion 5b located at the tread end side through the circumferential groove 4 is shifted from the slant groove portion 5a located at the central portion side of the tread through the circumferential groove 4 by an amount corresponding to approximately a width of the slant groove in the circumferential direction of the tire. Thus, the improvement of drainage property on a wet road surface and the reduction of pattern noise are simultaneously established at a higher level.

That is, water U drained from the slant groove portion 5a at the central portion side of the tread into the circumferential groove 4 is obliged to be somewhat swept away toward downstream side by main draining water S flowing in the circumferential groove 4 and then diverted and flowing into the other slant groove portion 5b, so that such a branch flow can sufficiently be smoothened by shifting the slant groove portion 5a to the slant groove portion 5b in the circumferential direction of the tire as mentioned above. Thus, the reduction of pattern noise can also be realized.

In addition, the circumferential width $W_0$ of the slant groove portion 5b opening to the circumferential groove 4 is made not less than a width $W_2$ of narrow portion of the circumferential groove 4 to create a pressure relation effective for the drainage. More preferably, an angle $\theta_t$ of the island unit 7 in the vicinity of the kicking-out side corner $E_t$ defined by the slant groove portion 5b with respect to the circumferential direction of the tire is made not less than an angle $\theta_1$ of the island unit 6 in the vicinity of the stepping-in side corner $E_1$ defined by the slant groove portion 5a, whereby the more smoothly branch flowing of water is ensured without changing a total inclination angle of the slant groove 5 or establishing the steering stability on dry road surface and the drainage property on wet road surface. In other words, when the angle $\theta_t$ is smaller than the angle $\theta_1$, the smooth flowing of draining water from the slant groove portion 5a through the circumferential groove 4 into the slant groove portion 5b can not be expected.

A comparison test among the tire according to the invention and two comparative tires I and II will be described below with respect to the steering stability on dry road surface, drainage property on wet road surface and reduction of pattern noise.

Test Tires

Invention tire: tire having a tread pattern shown in FIG. 1 and the aforementioned dimensions except that a circumferential width $W_1$ is 5.5 mm and a circumferential width $W_0$ is 10.5 mm to provide a circumferential width ratio $W_0/W_1$ of 1.91, and a differential level in the circumferential direction of the tire between kicking-out side corner $E_t$ and stepping-in side corner $E_1$ is 2 mm (which can be considered to be approximately same level in the circumferential direction of the tire), and each of the angles $\theta_t$ and $\theta_1$ is 55°.

Comparative tire I: tire having a tread pattern shown in FIG. 3 and the same dimensions as in the invention tire except that a circumferential width $W_0$ is 7.0 mm to provide a circumferential width ratio $W_0/W_1$ of 1.27 and a differential level between kicking-out side corner $E_t$ and stepping-in side corner $E_1$ in the circumferential direction of the tire is 6 mm.

Comparative tire II: tire having a tread pattern shown in FIG. 4 and the same dimensions as in the invention tire except that a circumferential width $W_0$ is 7.0 mm to provide a circumferential width ratio $W_0/W_1$ of 1.27 likewise the comparative tire I and a differential level between kicking-out side corner $E_t$ and stepping-in side corner $E_1$ in the circumferential direction of the tire is 1 mm.

Test Method

The steering stability on dry road surface was evaluated by a feeling of a test driver when the tire was run on a circuit course under normal internal pressure and normal load defined according to Japanese Industrial Standard. The drainage property on wet road surface was evaluated by measuring an area actually contacted with ground when the tire was run at a speed of 100-80 km/h on wet road surface having a water depth of 5 mm. The reduction of pattern noise was evaluated by a feeling on indoor noise when the vehicle was actually run at a speed of 100-60 km/h.

Test Results

The measured results are shown in Table 1 by an index on the basis that the comparative tire I is 100. Moreover, the larger the index value, the better the result.

TABLE 1

| | Invention tire | Comparative tire I | Comparative tire II |
|---|---|---|---|
| Steering stability on dry road surface | 100 | 100 | 100 |
| Drainage property on wet road surface | 108 | 100 | 105 |
| Pattern noise | 100 | 100 | 95 |

As seen from Table 1, the tire according to the invention can improve the drainage property on wet road surface by about 10% without degrading the steering stability on dry road surface and increasing the pattern noise as compared with the comparative tire I.

Moreover, the comparative tire II improves the drainage property on wet road surface because the positions of the corners $E_t$, $E_1$ in the circumferential direction of the tire are substantially equal level, but the improved amount is offset by the increase of the pattern noise.

As mentioned above, according to the invention, not only the drainage property on wet road surface can effectively be improved with holding the steering stability on dry road surface, but also the pattern noise can be reduced up to the same level as in the case that the positions of the slant groove portions separated through the circumferential groove are largely shifted from each other in the circumferential direction of the tire.

What is claimed is:

1. A unidirectional pneumatic radial tire comprising; at least one circumferential groove extending circumferentially of the tire at one end portion in widthwise direction of a tread, plural slant grooves arranged at approximately equal intervals in the circumferential direction of the tire and extending diagonally across the circumferential groove, each of said slant grooves being inclined in a direction toward a central portion of the tread in a preferred rotational direction of the tire, a circumferential width of a first portion of each of said slant grooves located axially outward from the circumferential groove toward a tread end and opening into the circumferential groove is within a range of 1.5-3.0 of a circumferential width of a second slant groove portion at a position of ground contact axially outward of said first portion, said slant grooves defining island units at both sides of said circumferential groove, a kicking-out side corner of an island unit located at an outside of the tread end being approximately aligned in an axial direction of said tread to a stepping-in side corner of an island unit located at a side of the central portion of the tread whereby a portion of said slant groove located at the tread end side is shifted from a portion of said slant groove portion located at the central portion side of the tread by an amount corresponding to approximately a width of said second slant groove portion in the circumferential direction of the tire; wherein said circumferential groove has a groove wall on the tread end side and extends straight in the circumferential direction of the tire and the groove wall on the side of the central portion of the tread is extended substantially in a sawtooth in the circumferential direction of the tire with said slant groove located at the central portion of said tread opening into said circumferential groove at a bent portion of said sawtooth groove wall.

2. The pneumatic radial tire according to claim 1, wherein said portion of the slant groove located from the circumferential groove toward the tread end is enlarged by largely chamfering a kicking-out portion of an island unit adjacent to said slant groove portion.

3. The pneumatic radial tire according to claim 1, wherein said circumferential groove has a maximum groove width of 9 mm and a minimum groove width of 7 mm.

4. The pneumatic radial tire according to claim 1, wherein a circumferential width of said slant groove portion opening to said circumferential groove is made not less than a width of a narrowest portion of said circumferential groove.

5. The pneumatic radial tire according to claim 1, wherein an angle of an island unit in a kicking-out side corner defined by said slant groove portion with respect to the circumferential direction of the tire is not less than an angle of an island unit in a stepping-in side corner defined by said slant groove portion.

* * * * *